Figure 1:
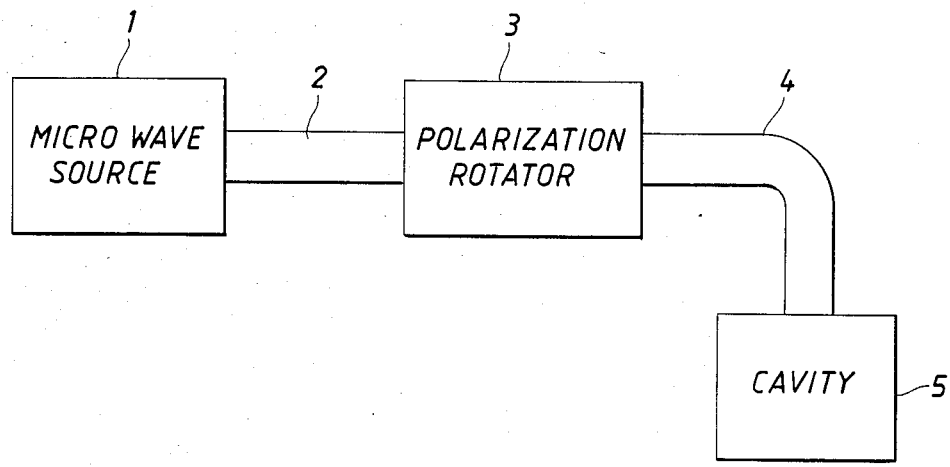

United States Patent [19]

Heard

[11] Patent Number: 4,684,776
[45] Date of Patent: Aug. 4, 1987

[54] METHOD AND APPARATUS FOR UNIFORM MICROWAVE BULK HEATING OF THICK VISCOUS MATERIALS IN A CAVITY

[75] Inventor: Nigel A. Heard, Chester, England

[73] Assignee: Shell Oil Company, Houston, Tex.

[21] Appl. No.: 857,873

[22] Filed: May 1, 1986

[30] Foreign Application Priority Data

May 1, 1985 [GB] United Kingdom ............... 8511049

[51] Int. Cl.⁴ .............................................. H05B 6/74
[52] U.S. Cl. ..................... 219/10.55 M; 219/10.55 A; 219/10.55 F; 134/1
[58] Field of Search ................ 219/10.55 F, 10.55 M, 219/10.55 A, 10.55 R, 10.65; 34/1; 134/1; 166/60, 248

[56] References Cited

U.S. PATENT DOCUMENTS

| | | | |
|---|---|---|---|
| 2,480,682 | 8/1949 | Stiefel | 219/10.55 R |
| 2,628,278 | 2/1953 | Zaleski | 178/44 |
| 2,769,145 | 10/1956 | Zaleski et al. | 333/7 |
| 2,943,175 | 6/1960 | Guanella | 219/10.55 F |
| 3,092,514 | 6/1963 | Tomberlin | 134/1 |
| 3,154,754 | 10/1964 | de Ronde | 333/7 |
| 3,189,722 | 6/1965 | Fritz | 219/10.55 F |
| 3,622,921 | 11/1971 | Heeren | 333/21 A |
| 3,843,860 | 10/1974 | Jory et al. | 219/10.55 |
| 4,060,781 | 11/1977 | Hudspeth et al. | 333/98 S |
| 4,067,683 | 1/1978 | Klaila | 219/10.55 R X |
| 4,301,347 | 11/1981 | Quine | 219/10.55 F |
| 4,324,968 | 4/1982 | Smith | 219/10.55 F |
| 4,336,434 | 6/1982 | Miller | 219/10.55 F |
| 4,446,349 | 5/1984 | Smith | 219/10.55 F |
| 4,464,554 | 8/1984 | Bakanowski | 219/10.55 F |

FOREIGN PATENT DOCUMENTS

| | | |
|---|---|---|
| 0014121 | 8/1980 | European Pat. Off. . |
| 2144350 | 6/1972 | France . |
| 8002902 | 12/1980 | PCT Int'l Appl. . |
| 930311 | 9/1959 | United Kingdom . |
| 1185363 | 6/1968 | United Kingdom . |
| 605348 | 3/1976 | U.S.S.R. . |
| 1040552A | 12/1980 | U.S.S.R. . |

Primary Examiner—Philip H. Leung

[57] ABSTRACT

A method for uniform bulk heating of thick viscous materials in a cavity not specifically designed for microwave heating. Microwaves are passed through a first waveguide to a polarization rotator. The direction of polarization of the incoming waves is rotated slowly and continuously and subsequently the rotated waves are passed through a second waveguide to the cavity to be heated.

6 Claims, 2 Drawing Figures

METHOD AND APPARATUS FOR UNIFORM MICROWAVE BULK HEATING OF THICK VISCOUS MATERIALS IN A CAVITY

FIELD OF THE INVENTION

The invention relates to uniform microwave bulk heating of thick viscous materials having poor thermal conductivity and thermal diffusivity which are stored in cavities not specifically designed for microwave heating. Examples of such materials are bitumen, lube oil additives and base oils.

BACKGROUND OF THE INVENTION

In the handling of such thick viscous stored materials heating is required to give effective product flow with minimal stickage. Of particular interest are the hard oxidized grades of bitumen which have to be handled at temperatures in excess of 200° C. to enable effective product pumping and are transported in road or rail delivery tankers. After deliveries, particularly over long distances, a tare buildup of the order of 2 to 2½ tons in 18 ton capacity delivery tankers can occur. The penalties associated with tare buildup are: reduction in carrying capacity of tankers; tanker sequencing and product contamination problems; fuel wastage in carrying unwanted extra weight. The removal of tare buildup by physically chipping out of the hardened product is a time consuming job resulting in the vehicle being out of usage for several days.

Also of interest are materials such as lube oil additives and base oils. It is usual to heat these products which are stored in drums to about 40° C. before handling to give increased flow but exceptional care must be taken to ensure the material temperature does not exceed 80° C. otherwise product degradation occurs.

Traditional heating methods (for example electric ovens or steam heating) are slow and not very efficient. Current industrial and domestic microwave heating techniques rely upon placing the product to be heated in ovens or cavities specifically designed to receive microwave energy and provide uniform heating. This is not practicable for the present application wherein a successful solution to the tare buildup problem would result in an unmodified bitumen tanker driving into a microwave bay and having a microwave waveguide connection made to the tanker in order to allow microwave energy to heat the bitumen tare. For the lube oil additives and base oils stored in drums the microwave energy would be directed into the drum via a waveguide connection, screwed directly into the filling bunghole. The immediate problems in both these applications are ensuring the heat distribution is uniform.

If a continuous electromagnetic wave at microwave frequencies is injected into a tank or drum a standing wave interference field pattern will be set up which will not vary with time. The pattern consists of a series of points of minimum intensity called nodes and maximum intensity called antinodes. The precise configuration of the standing wave or mode pattern is dependent upon the frequency of the microwave energy used to excite the cavity and upon the dimensions of the cavity itself. Since the degree of microwave heating is proportional to the applied field strength such a pattern gives rise to hot spots at the antinodes and little or no heating at the nodes.

In an effort to alleviate the problem of non-uniform energy distribution, a great many approaches have been tried. Two common techniques currently applied to avoid non-uniform heating are mode stirring or product movement. The former relies on the insertion of a large mechanically rotating fan to mix the waves as they enter the vessel thereby continually changing the standing wave pattern with time. It is not feasible to fit such a mode stirrer in a road or rail tanker or drum because of physical size limitations in inserting such a fan within the tanker or drum. The second technique accepts a fixed standing wave pattern and moves the product through it. Again this is not feasible for high viscous materials in road or rail tankers or drums.

U.S. Pat. No. 4,324,968 describes a different technique for promoting time averaged uniformity of microwave energy distribution. In this patent, a coupling aperture such as an X slot is used for radiating circularly polarized microwave energy from a feedwave guide into the adjacent heating cavity, where the slot is capable of being moved selectively with respect to the waveguide centerline. This movement of the X slot aperture causes a continual change in the sectional shape of the resulting field, from circular to elliptical with the degree and orientation of the ellipse depending upon the direction and degree of movement of the coupling aperture with respect to the waveguide centerline. Rather than physically moving the aperture, a device is provided for varying the electrical position of the coupling aperture with respect to the centerline of the waveguide as a function of time. In contrast, the present invention provides a mechanical means to continually vary linearly polarized microwave energy from a waveguide into an adjacent heating cavity. This continually changing microwave beam sweeps the interior of the heating cavity and thereby improves the time averaged energy distribution within the cavity. As a result of the continually changing feedwave, the standing waves in any one direction of the cavity dimensions are minimized.

It is therefore an object of the invention to provide a fast and efficient method and apparatus for uniform microwave bulk heating of high viscous materials in cavities such as road or rail tankers or drums which are not specifically designed for microwave heating.

SUMMARY OF THE INVENTION

The invention therefore provides a method for uniform microwave bulk heating of thick viscous materials in a cavity not specifically designed for microwave heating comprising the steps of generating microwaves; passing the generated microwaves through a waveguide to a polarization rotator; slowly and continuously rotating the direction of polarization of the incoming waves and subsequently passing the waves to the cavity to be heated.

The invention also provides an apparatus for uniform microwave bulk heating of thick viscous materials in a cavity not specifically designed for microwave heating, comprising a microwave generator, a first waveguide for propagating the generated microwaves, a means for slowly and continuously rotating the direction of polarization of the incoming microwaves from the said waveguide and a second waveguide for feeding the rotated waves into the said cavity.

DESCRIPTION OF THE INVENTION

Figure 2:
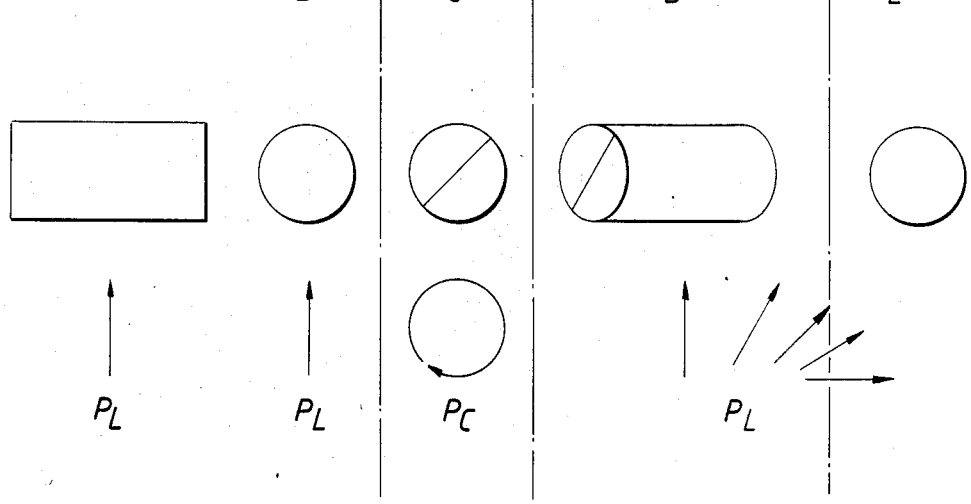

The invention will now be described in more detail by way of example with reference to the accompanying drawings in which:

FIG. 1 represents schematically a flow scheme of the microwave heating of the invention; and FIG. 2 represents schematically a detail of FIG. 1.

Referring now to FIG. 1, a microwave source 1 such as a magnetron is connected through a first waveguide 2 to an external polarization rotator 3 which is connected by a second waveguide 4 to a tank or cavity 5 designed for storing a viscous product such as bitumen, lube oil additives or base oils. The microwave source may be a microwave energy generator usually comprising a magnetron tube which provides microwave energy output at an antenna or probe. In connection with the magnetron, there is usually a blower and a cylindrical duct for channeling air flow over the magnetron cooling fins. In smaller size conventional microwave oven practice, the feed waveguide serves the dual role of conveying microwaves, as well as air flow. A portion of the cooling air flow passing from the blower over the magnetron cooling fins passes through the wave guide and into the heating cavity. Such air flow into the heating cavity aids in carrying away moisture-laden air, which escapes through conventional vent openings and provides some utilization of magnetron waste heat.

It will be understood that numerous other components, not illustrated, are required in a complete microwave heating system, but for clarity of illustration and description, only those elements believed essential for a proper understanding of the present invention are shown and described. These other components include, for example, a high voltage DC power supply for the magnetron microwave source. Such elements may all be conventional, and as such are well known to those skilled in the art.

FIG. 2 represents schematically the operation of the external polarization rotator 3 of FIG. 1.

Using FIG. 2 the operation of the polarization rotator 3 is as follows:

Section A: The microwaves leave the generator (not shown) in standard rectangular waveguide with linear polarization. The direction of the polarization has been indicated by the arrow $P_L$.

Section B: The waves then pass through a rectangular to circular waveguide transformer still with linear polarization ($P_L$) but now in a waveguide section which unlike rectangular waveguide, can support circular polarization.

Section C: Contains a quarter wave plate which changes the polarization of the incoming wave from linear to circular (indicated by the circle $P_c$). The plate is mounted at 45° to the plane of polarization of the linearly polarized wave which is resolved into two equal waves having their planes of polarization parallel and perpendicular to the plate vane. After passage through the quarter wave plate, the wave having its electric field parallel to the vane will be retarded in phase by 90° compared with the perpendicular wave i.e. a circularly polarized wave. Conversely, if the input to a quarter wave plate is circularly polarized the output wave is linearly polarized. It is required to convert from linear to circular polarization in Section C in order to feed the second quarter wave plate in Section D with a circularly polarized wave which can be linearly polarized at any angle by the second quarter wave plate.

Section D: Contains another quarter wave plate which, as described in Section C, converts the incoming circularly polarized wave to linear polarization ($P_L$). However, this complete section is mechanically rotated thereby slowly rotating the vector ($P_L$). This section would also contain r.f. chokes to prevent microwave leakage from the rotating section. In an advantageous embodiment of the invention this section is mechanically rotated at about 1 to about 50 r.p.m.

In a preferred embodiment of the invention this section is mechanically rotated at about 15 r.p.m.

Section E: Is the final waveguide feed into the tank.

Thus the slow temporal variation in polarization vector angle will provide a standing wave pattern which will vary slowly with time and provide a more uniform heating cycle.

It will be appreciated that any operating microwave frequency and waveguide diameter suitable for the purpose can be used and any mechanical manner of rotation suitable for the purpose may be applied.

An advantageous operating frequency for bitumen heating is 896 MHz whereas for drumheating of lube oil additives and base oils a frequency of 2.45 GHz can be applied.

In view of the foregoing, it will further be appreciated that the present invention provides a means for controlling electric field shape and for varying the field so as to provide more uniform heating within a cavity not specifically designed for microwave heating.

Various modifications of the invention will become apparent to those skilled in the art from the foregoing description and accompanying drawings. Such modifications are intended to fall within the scope of the appended claims.

What is claimed is:

1. A method for uniform microwave bulk heating of thick viscous materials in a cavity not specifically designed for microwave heating comprising the steps of generating microwaves; passing the generated microwaves through a first waveguide to a polarization rotator; slowly and continuously rotating the direction of polarization of the incoming waves wherein the rotation takes place external to the cavity; and subsequently passing the waves to a second waveguide for feeding the rotated waves into the cavity to be heated.

2. The method of claim 1 wherein the rotation of the polarization direction takes place mechanically.

3. The method of claim 2 wherein the rotation takes place at about 1 to about 50 r.p.m.

4. The method of claim 2 wherein the rotation takes place at about 15 r.p.m.

5. The method of claim 1 wherein the thick viscous materials are bitumen and the frequency of the microwaves is about 896 MHz.

6. The method of claim 1 wherein the thick viscous materials are selected from the group consisting lube oil additives and base oils, and the frequency of the microwaves is about 2.45 GHz.

* * * * *